(12) United States Patent
Shyu et al.

(10) Patent No.: US 7,991,178 B2
(45) Date of Patent: Aug. 2, 2011

(54) METHOD AND DEVICE FOR NOISE CONTROL IN A HEADSET

(75) Inventors: Ching Shyu, San Jose, CA (US); Osman K. Isvan, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1307 days.

(21) Appl. No.: 11/591,893

(22) Filed: Nov. 1, 2006

(65) Prior Publication Data

US 2008/0101643 A1     May 1, 2008

(51) Int. Cl.
    *H04R 25/00*      (2006.01)
(52) U.S. Cl. .................. 381/375; 381/374; 381/381
(58) Field of Classification Search .................. 381/370, 381/374, 375, 379–383; 379/430
See application file for complete search history.

(56) References Cited

U.S. PATENT DOCUMENTS

| | | | |
|---|---|---|---|
| 6,047,076 A * | 4/2000 | Yang | 381/381 |
| 6,768,804 B1 | 7/2004 | Isvan | |
| 2003/0119565 A1 | 6/2003 | Lin | |

FOREIGN PATENT DOCUMENTS

| | | |
|---|---|---|
| GB | 2317301 A | 3/1998 |
| WO | 92/11738 A | 7/1992 |
| WO | 01/66967 A | 9/2001 |

OTHER PUBLICATIONS

International Search Report in PCT/US2007/023003, mailed on May 14, 2008.
Written Opinion of the International Searching Authority in PCT/US2007/023003, mailed on May 14, 2008.
U.S. Appl. No. 09/990,097, filed Nov. 20, 2001, Isvan.

* cited by examiner

*Primary Examiner* — Suhan Ni
(74) *Attorney, Agent, or Firm* — Willam Winters; Michael D. Rodriguez

(57) ABSTRACT

A headset is disclosed. The headset includes an earpiece, a voice conducting and connecting system and a microphone connected to the voice conducting and connecting system, the microphone being capable of operating in a directional configuration and in an omnidirectional configuration.

12 Claims, 3 Drawing Sheets

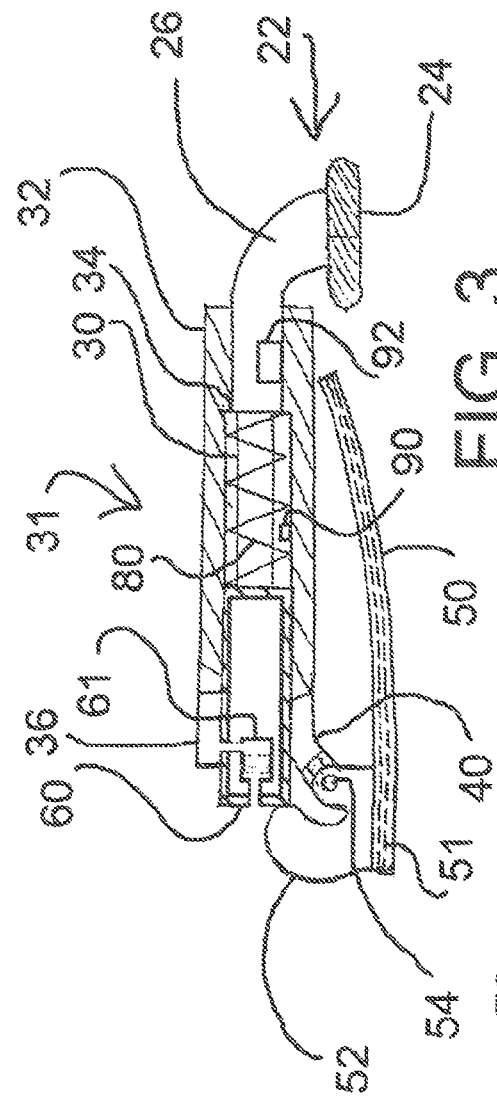
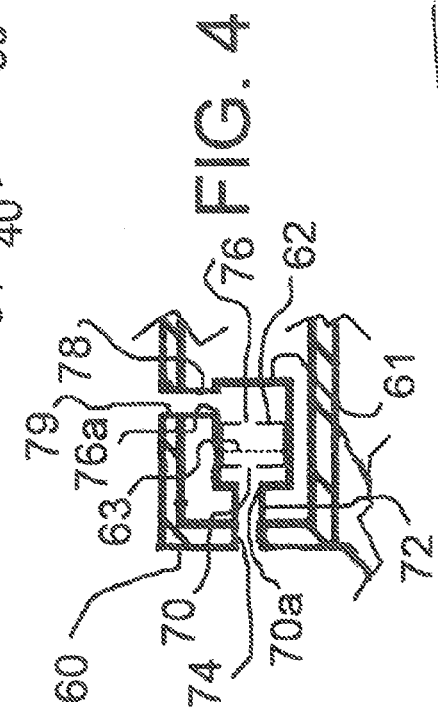
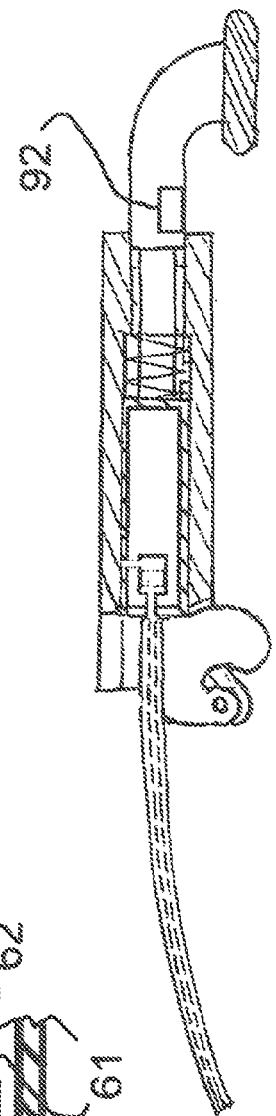

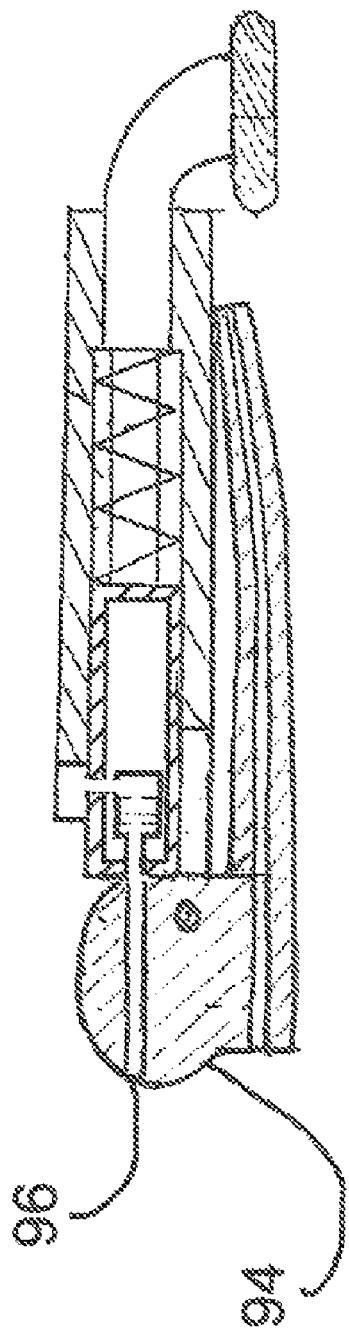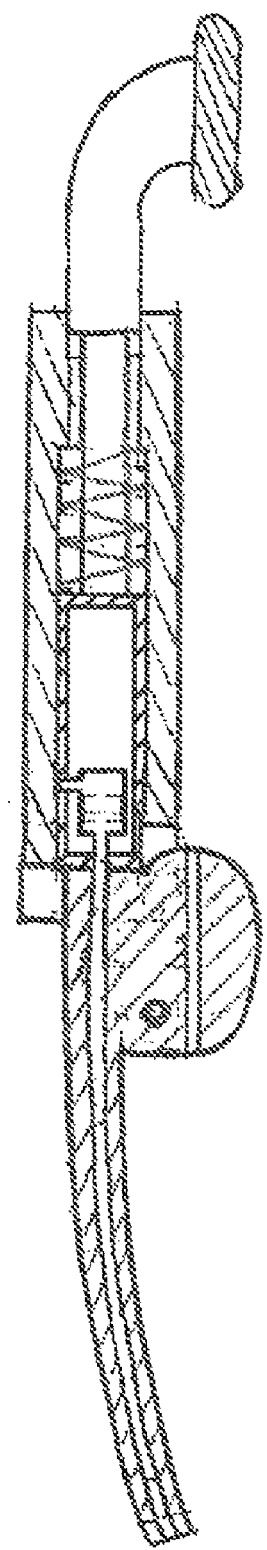

METHOD AND DEVICE FOR NOISE CONTROL IN A HEADSET

FIELD OF THE INVENTION

The present invention relates generally to the field of headsets, including those used with telephone communication.

BACKGROUND OF THE INVENTION

Headsets of various types are commonly used for telephone or radio communication. With reference to FIG. 1 a conventional headset system 10 shown, including a headband 12 on which is mounted a speaker assembly 14 located near the user's ear. A boom 16 is connected to the speaker assembly 14 to carry sound from the user's mouth to a microphone, not shown, which is located near the speaker assembly 14. An alternative form of a conventional headset is shown in FIG. 2, which includes an over the ear connector 20 which enables the user to mount the connector 20 to the ear. Both types of headsets can send and receive signals using wires connected to a source such as a telephone, or they can send and receive signals without wires via a small radio receiver/transmitter.

Contemporary headset design demands that a headset be compact and discreet. In a headset, the spacing between the end of the boom and the user's mouth influences the quality of the audio signal received by the microphone and therefore the quality of the signal transduced by the microphone and the electronic signal transmitted by the microphone. Normally, if the end of the boom is closer to the user's mouth a higher quality signal can be produced by the microphone than if the end of the boom is far away. Also, a noisy environment can adversely affect the ability of the microphone to transduce and transmit an accurate rendition of the voice of the user. Therefore, to communicate well in the presence of background noise the distal end of the boom must be located relatively near the user's mouth, which can result in the boom being long so that the style is not ideal.

Accordingly, it is desirable to have a headset with improved noise cancelling abilities and which meets today's aesthetic design requirements.

BRIEF SUMMARY OF THE INVENTION

An embodiment of the present headset includes an earpiece, a voice conducting and connecting system, and a microphone. The microphone is capable of operating in a directional configuration and in an omnidirectional configuration, and a conversion system is provided to permit a user to selectively convert the microphone between the directional configuration and the omnidirectional configuration. The voice conducting and connection system can include a voice tube and a boom, and the user can locate the voice tube in a retracted, discreet position or in an extended, high performance position.

Further features and advantages of the present invention, as well as the structure and operation of the above-summarized and other exemplary embodiments of the invention, are described in detail below with respect to accompanying drawings, in which like reference numbers are used to indicate identical or functionally similar elements.

BRIEF DESCRIPTION OF THE DRAWINGS

FIG. 3 is a schematic illustration showing in partial cross-section an embodiment of the present headset in the retracted, discreet, position;

FIG. 4 is a schematic, cross-sectional illustration of a portion of the embodiment shown in FIG. 3;

FIG. 5 is a schematic, cross-sectional illustration of the embodiment of the headset of FIG. 3, shown in the open, extended, position;

FIG. 6 is a schematic, cross-sectional illustration showing an alternative embodiment of the present headset in the retracted, discreet, position; and FIG. 7 is a schematic, cross-sectional illustration of the alternative embodiment of the headset of FIG. 6, shown in the open, extended, position

DETAILED DESCRIPTION

Figure 1:
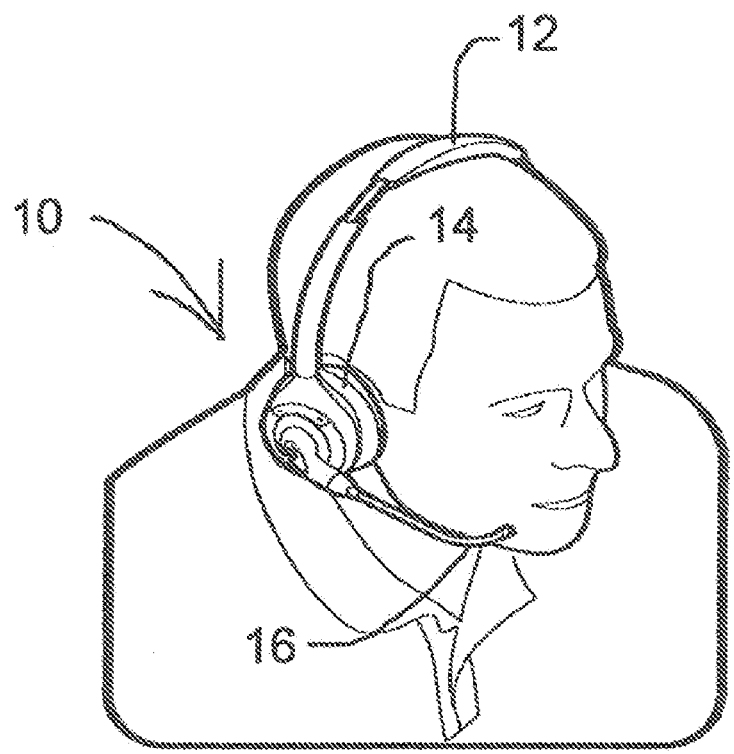
FIG. 1 illustrates a conventional headset.
Figure 2:
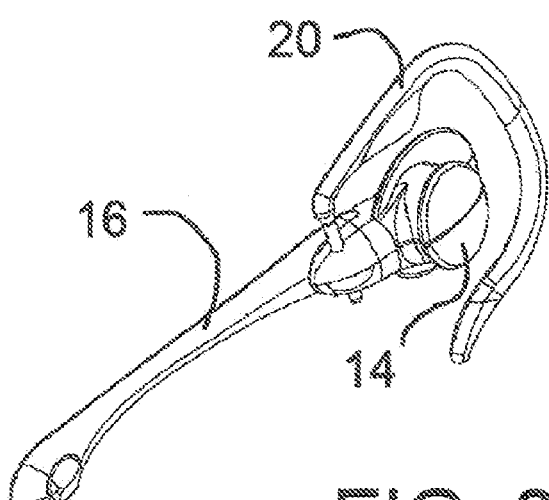
FIG. 2 illustrates a conventional ear-mounted headset.

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

With reference to FIGS. 3-5 an embodiment of the present headset is shown in partial cross-sectional, schematic form. The headset includes an earpiece 22 which contains a speaker, not shown, and a resilient member 24 which is designed to engage the user's ear. It should be understood that the earpiece 22 also includes an ear engagement member, not shown, which can be hooked over the user's ear so the device can be carried by the user without the use of the hands. The earpiece 22 also includes a curved, cylindrical member 26 which is connected to an internal shaft 30, and the distal end of the curved, cylindrical member 26 is connected to a boom 31.

The boom 31 includes an external housing 32 which is substantially cylindrical, and the external housing 32 includes an internal flange 34 near the proximal end and an opening 36 at the distal end thereof. Also, at the distal end of the external housing 32 the housing includes a hinge 40 on which is mounted a voice tube 50 and a cam 52. The voice tube 50 is a cylinder having a bore 51. The voice tube 50 has an arcuate configuration and the proximal end is connected to the cam 52. The cam 52 and the hinge 40 are connected together by pin 54 so that the cam and voice tube 50 can rotate with respect to the external housing 32.

The boom 31 also includes a microphone module 60 which is located inside the distal end of the external housing 32. The microphone module 60 is substantially cylindrical and hollow and has closed ends, and the microphone module 60 fits in slideable engagement within the central bore of the external housing 32. A microphone boot 61 is mounted inside the distal end of the microphone module 60, and a noise canceling microphone 62 of conventional design is mounted inside the microphone boot 61.

The noise canceling microphone 62 includes a diaphragm 63 with a main port 70 located to one side of the diaphragm 63 and a cancellation port 76 located to the opposite side of the diaphragm 63. A first opening 70a is formed in the boot 61 adjacent the main port 70, and a second port 76a is formed in the boot 61 adjacent the cancellation port 76. A primary tube 72 is located between the first opening 70a and a primary port 74 formed in the distal end of the microphone module 60. A second tube 78 is located between the second opening 76a and a secondary port 79 formed in the side of the microphone module 60. It should be understood that for clarity electrical wiring of the microphone 60 is not shown in the drawings. One design of a conventional noise canceling microphone which can be used with the present embodiment is commonly used in hearing aids in which the noise canceling microphone amplifies sounds coming from the direction in which the user is facing while suppressing other sounds. One such hearing aid is taught in U.S. Pat. No. 3,876,843 titled "Directional Hearing Aid with Variable Directivity."

A helical spring 80 is located around the internal shaft 30 and between the internal flange 34 and the proximal end of the microphone module 62 to bias the internal flange 34 and the proximal end of the microphone module 62 away from each other.

It should be appreciated that a number of electronic components of the device have been omitted from the drawings for the purpose of clarity. For example, a radio transmitter/receiver, not shown, is located inside the earpiece, and wiring, not shown, connects the microphone 62 to the transmitter/receiver. The transmitter/receiver can be designed to communicate with a conventional Bluetooth device, for example.

The operation of the device can now be understood. In FIG. 3 the headset is shown in a discreet (retracted) mode in which the voice tube 50 is oriented so that the distal end of the voice tube 50 is located near the external housing 32. In this mode when the device is turned off the user can carry the device in a shirt pocket, for example, and the voice tube 50 can conveniently function as a clip to help hold the device in the user's pocket.

When the user wishes to operate the headset in the discreet mode the user hooks the device over his/her ear with an over the ear connector, not shown, so that the resilient member 24 is adjacent the user's ear and the primary port 74 points toward the user's mouth. In this mode the spring 80 biases the microphone module in the distal direction, and the distal end of the microphone module 60 abuts the cam 52. The distal end of the microphone module 60 protrudes from the distal end of the external housing 32 so that the secondary port 79 is exposed to the atmosphere. Accordingly, the secondary port 79 and the cancellation port 76 of the microphone 62 receive sonic vibrations from the atmosphere. Therefore the noise cancellation microphone 62 operates in a directional mode with the preferred direction located toward the user's mouth. Thus the directional microphone operates to suppress ambient noise and helps to enhance the microphone's ability to respond to the user's voice.

In some circumstances the user may wish to use the headset in a high performance (extended) mode instead of the discreet mode shown in FIG. 3. In this case the user rotates the cam 52 and voice tube 50 about the hinge 40 so that the device is in the high performance position as shown in FIG. 5. In this configuration the distal end of the voice tube 50 is located near the user's mouth, and the proximal end of the voice tube 50 abuts the distal end of the microphone module 60. Also, the proximal end of the bore 51 of the voice tube 50 is aligned with the primary port 74 so that the bore conveys the user's voice from the user's mouth to the main port 70 of the noise canceling microphone 62. It should be noted that the cam 52 has forced the microphone module in the proximal direction and into the external housing 32 so that the secondary port 79 is located within the external housing 32. In this orientation the external housing 32 forms a good acoustic seal with the secondary port 79 so that the ambient noise reaching the cancellation port 76 is minimized. Thus the noise cancellation feature of the microphone 62 has essentially been disabled and the microphone 62 now functions essentially as an omnidirectional microphone.

It should be understood that the profile of the cam 52 is such that during the first part of the pivoting motion the spring 80 forces the voice tube 50 toward the retracted position shown in FIG. 3, while in the second part of the pivoting motion the spring forces the voice tube toward the open position shown in FIG. 5. In other words, when the device is held horizontally with the earpiece 22 on the right and voice tube 50 at the bottom, to open the voice tube 50 from the closed position (the 3 o'clock position) to about the 6 o'clock position the user must apply force against the spring, and thereafter the spring 80 causes the voice tube to snap to the fully open (9 o'clock) position. Once the device is in the open position the spring 80 acts to keep the second port 74 acoustically sealed against the distal end of the voice tube 50, and the spring 80 also acts to keep the voice tube in the open position.

It should also be understood that as the voice tube is moved from the closed position (FIG. 3) to the open position (FIG. 5) the internal shaft 30 pushes the curved cylindrical member 26 in the proximal direction relative to the external housing 32. Thus the external housing 32 is moved in the distal direction while the microphone module 62 does not move relative to the earpiece 22.

Optionally, a switch 90 can be located in the external housing 32 to sense the position of the microphone module 60 relative to the housing 32. The switch 90 would send signals to a control circuit 92 which would perform one or more of the following functions:
 1. To change the microphone gain, so that the transmit sensitivity relative to the user's voice remains nearly constant whether the voice tube 50 is in the open or closed position.
 2. To engage a frequency equalization circuit so that the frequency response remains nearly constant whether the voice tube 50 is in the open or closed position.
 3. To enable or disable noise reduction, to change expansion depth, or other processes that may have unwanted artifacts. A typical example of such a process is voice switching gated by the received signal, which may be necessary for echo control in the discreet mode only.

Turning now to FIGS. 6-7 an alternative embodiment is shown. In this embodiment many of the components are the same as in the embodiment shown in FIGS. 3-5 and discussed above. However, unlike the FIGS. 3-5 embodiment the embodiment of FIGS. 6-7 includes a bored cam member 94, which includes bore 96. In the closed position (FIG. 6) the bore 96 aligns with the second port 74 to essentially form an extension of the second tube 72 toward the user's mouth. Thus by selecting an appropriate diameter of the cam 94 the effective length of the second tube 72 can be extended while the voice tube 50 is in the closed position.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. Accordingly, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A headset comprising:
    an earpiece;
    an internal shaft connected to said earpiece;
    an external housing connected to said internal shaft;
    a voice tube connected to said external housing; and,
    a microphone module slidably disposed within said external housing;
    a microphone boot disposed within said microphone module;
        wherein the microphone boot comprises a primary port and a secondary port; and
    a microphone connected to said microphone boot.

2. A headset according to claim 1 wherein said voice tube is constructed and arranged so that when said voice tube is in a first position said voice tube causes said earpiece to be spaced apart a first distance from a distal end of said voice tube, and when said voice tube is in a second position said voice tube causes said earpiece to be spaced apart a second distance from the distal end of said voice tube.

3. A headset according to claim 1 further comprising a spring connected between said external housing and said microphone module.

4. A headset according to claim 1 further comprising a cam connected to a proximal end of said voice tube.

5. A headset according to claim 4 wherein said cam is constructed and arranged to cooperate with said microphone module.

6. A headset comprising:
    an earpiece member;
    a housing connected to said earpiece member;
    a microphone module slidably disposed within said housing;
    a microphone boot disposed within said microphone module;
        wherein the microphone boot comprises a primary port and a secondary port;
    a microphone connected to said microphone boot; and,
    a voice tube connected to said housing;
        wherein said voice tube is constructed and arranged so that said voice tube can be located in a first position or in a second position relative to said housing.

7. A headset according to claim 6 wherein said voice tube has a proximal end and a distal end, and the proximal end of said voice tube is connected to said housing.

8. A headset according to claim 7 wherein the proximal end of said voice tube is connected to said housing by a hinge.

9. A headset according to claim 7 wherein when said voice tube is in the first position the distal end of the voice tube is located adjacent the housing.

10. A headset according to claim 7 wherein when said voice tube is in the first position the distal end of the voice tube is located substantially spaced apart from the housing.

11. A headset according to claim 6 further comprising a spring to bias said voice tube to the first position.

12. A headset according to claim 11 wherein said spring also biases said voice tube to the second position.

* * * * *